Figure 3:
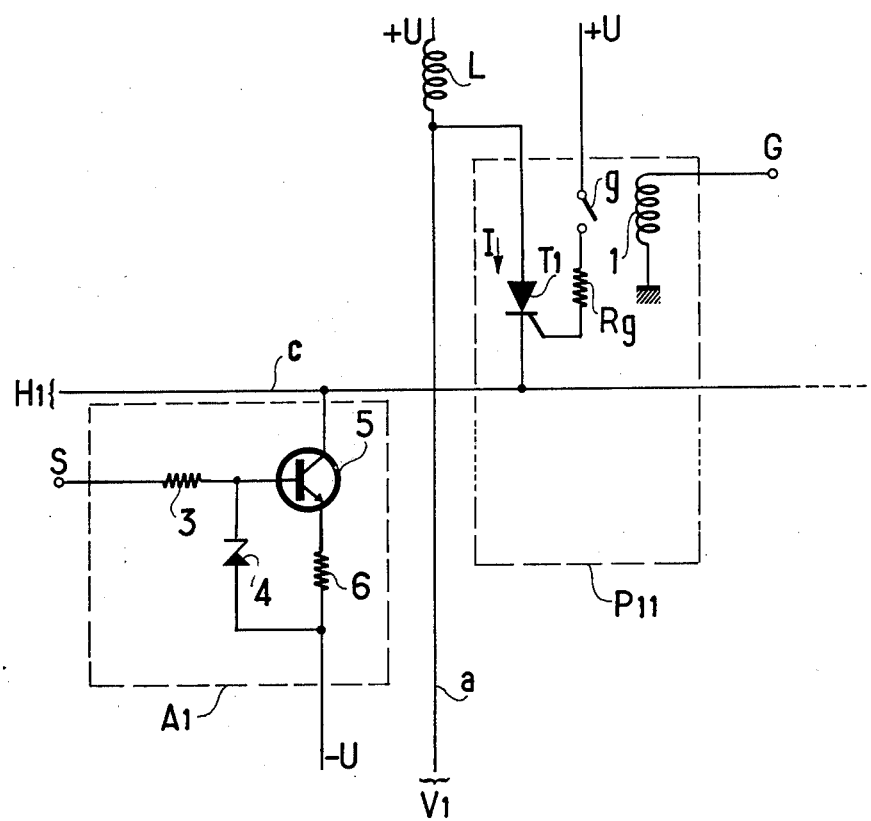

United States Patent [19]

Hugel et al.

[11] 4,190,743
[45] Feb. 26, 1980

[54] THYRISTOR SWITCHING MATRIX

[75] Inventors: Philippe Hugel, Illkirch Graffenstaden; Henri Kraess, Strasbourg; Remi Louis, Limersheim; Louis Vidonne, Sallanches, all of France

[73] Assignee: Societe Anonyme Dite: La Telephonie Industrielle et Commerciale-Telic, Strasbourg, France

[21] Appl. No.: 917,229

[22] Filed: Jun. 20, 1978

[30] Foreign Application Priority Data

Jun. 30, 1977 [FR] France .................. 77 20076

[51] Int. Cl.$^2$ .................................... H04Q 3/52
[52] U.S. Cl. .................. 179/18 GF; 340/166 R
[58] Field of Search ............. 179/18 GF; 340/166 R

[56] References Cited

U.S. PATENT DOCUMENTS

| | | | |
|---|---|---|---|
| 3,141,067 | 7/1964 | Spandorfer | 179/18 GF |
| 3,801,749 | 4/1974 | Jovic | 179/18 GF |
| 3,828,314 | 8/1974 | Bradbery et al. | 179/18 GF X |
| 3,976,845 | 8/1976 | Ashley | 179/18 GF |
| 3,993,978 | 11/1976 | Hollis | 179/18 GF X |
| 4,025,726 | 5/1977 | Matsuyama et al. | 179/18 GF |
| 4,113,989 | 9/1978 | Schneider | 179/18 GF |

*Primary Examiner*—Thomas W. Brown
*Attorney, Agent, or Firm*—Sughrue, Rothwell, Mion, Zinn and Macpeak

[57] ABSTRACT

In a thyristor switching matrix, each horizontal line (Hl to Hm) is connected via a protective device (e.g. A1, A2) to a DC source—U. The protective device (A1, A2) normally isolates the horizontal line. When a connection point (e.g. Pll) closes a signal is applied to the protective device (A1, A2) and the horizontal line (Hl) is brought to a potential sufficient for the trigger current through any of the thyristors connected to the horizontal line (Hl) to be lower than the minimum trigger current required for firing them; thus, the connecting in parallel of several vertical lines (e.g. V1, V2) is avoided.

3 Claims, 3 Drawing Figures

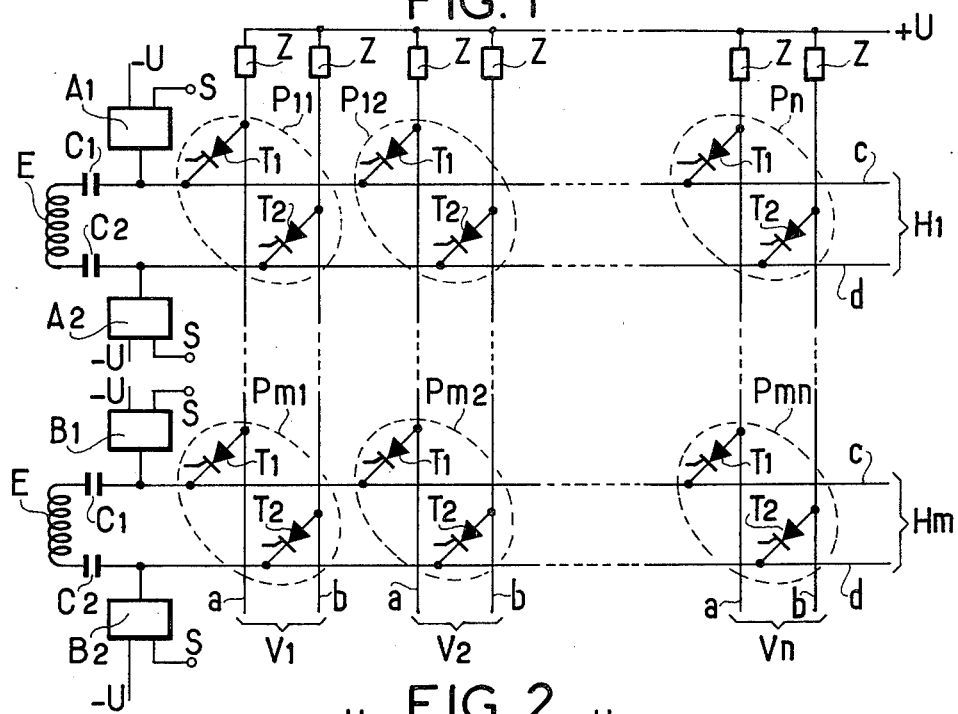
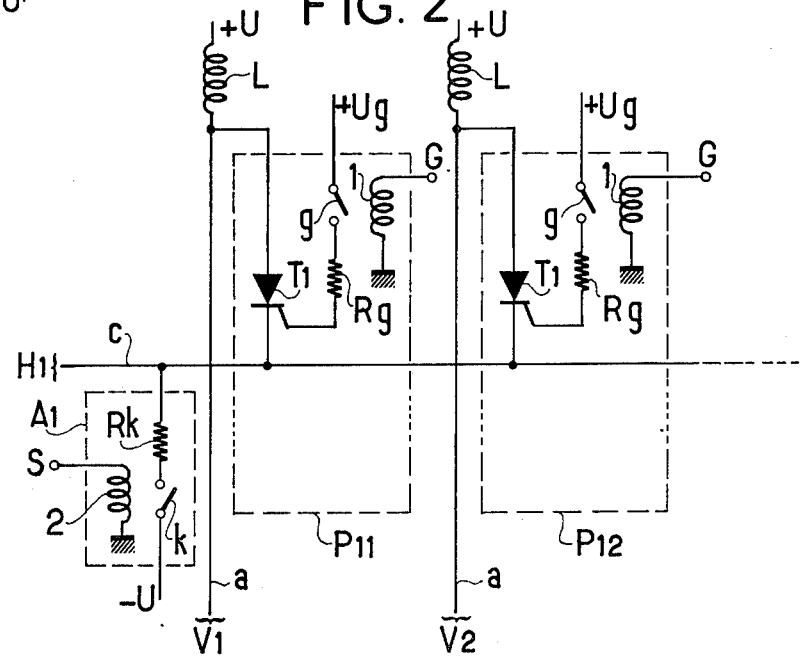

THYRISTOR SWITCHING MATRIX

The invention relates to thyristor switching matrices, in particular to matrices used in the telecommunications industry and more particularly in the telephone industry.

Switching matrices are already known whose connection points are formed by semiconductor devices and in particular by thyristors. Generally, several switching matrices are associated with one another to form a switching network, the number of switching matrices being a function of the size of the telephone exchange.

To connect two subscribers via a switching matrix which comprises horizontal lines and vertical lines, two connection points, i.e. one connection point per subscriber, must be closed, in the event that the subscribers are connected to the horizontal lines of the connection matrix. Each horizontal line is connected to each vertical line by a connection point and as soon as one connection point between a horizontal line and a vertical line is closed, no other connection point connecting the said horizontal line to any other vertical lines should be closed; however, in thyristor switching matrices, the thyristors which connect said horizontal line to the vertical lines can still be fired, which would lead to undesirable connection of vertical lines in parallel.

The invention aims to provide a thyristor switching matrix in which such undesirable firing of the thyristors cannot occur.

The present invention provides a thyristor switching matrix which comprises horizontal lines, vertical lines and thyristor connection points between the horizontal lines and the vertical lines, the vertical lines being connected to one polarity of a DC source and each horizontal line being connected to the other polarity of said source via a protective device which receives a signal at the same time as the trigger of a thyristor when a connection point closes, said protective device isolating the horizontal line to which it is connected when there is no signal, and, after having received said signal bringing said horizontal line to which it is connected to a potential which reduces the trigger voltage in order to limit the current in the trigger circuits of the other thyristor connected to said horizontal line to a value lower than the minimum trigger current necessary for firing these other thyristors, the closing of a connection point between a horizontal line and a vertical line having no effect on the other connection points between the said vertical line and other horizontal lines, whereby each vertical line may be connected to as many horizontal lines as may be necessary to establish a connection between at least two terminals connected to respective horizontal lines.

The invention will be described with reference to embodiments illustrated by the accompanying drawings in which:

FIG. 1 shows a thyristor switching matrix;
FIG. 2 shows a protective device; and
FIG. 3 shows a variant of a protective device.

FIG. 1 shows a thyristor switching matrix which has m horizontal lines H1 to Hm and n vertical lines V1, V2 ... Vn. Each horizontal line is constituted by two wires c and d connected to a winding E of a subscriber's transformer via respective capacitors C1 and C2. The vertical lines are each constituted by two wires a and b which are connected to a voltage source +U via a bias resistor or coil Z. The horizontal and vertical lines are connected together by connected points; the horizontal line H1 is connected to the vertical lines V1, V2 ... Vn by connection points P11, P12, ... P1n; the horizontal line Hm is connected to the vertical lines V1, V2, ... Vn by connection points Pm1, Pm2, ... Pmn. Each connection point comprises two thyristors T1 and T2, the thyristor T1 connecting the wire a of a vertical line to the wire c of a horizontal line, the thyristor T2 connecting the wire b of a vertical line to the wire d of a horizontal line; all the connection points are therefore identical. Each wire of a horizontal line is connected to a voltage source −U via a protective device; the wires c and d of the horizontal line H1 are connected to the voltage source −U via respective protective devices A1 and A2; the wires c and d of the horizontal line Hm are connected to the voltage source −U via respective protective devices B1 and B2; the protective devices A1, A2, B1 and B2 are identical and each includes a terminal S. When a connection point, e.g. P11, is to be closed, the triggers of the thyristors T1 and T2 of the connection point P11 receive a control signal and the terminals S of the protective devices A1 and A2 also receive a control signal. The control signals sent to the triggers of the thyristors T1 and T2 and to the terminals S of the protective devices A1 and A2 come from control units of the telephone exchange of which the switching matrix forms a part; the control units determine the connections to be made, hence the connection points to be closed to make connections, as is usual in a telephone exchange.

FIG. 2 shows a protective device. This figure shows the wire c of the horizontal line H1 for example, the wires a of the vertical lines V1, V2, the thyristors T1 of the connection points P11 and P12 and the protective device A1 associated with the wire c. Each wire a of a vertical line is connected to the wire c of the horizontal line H1 by a thyristor T1; an inductance coil L at the end of each vertical line blocks the passage of the signal towards the current source; the trigger of each thyristor is connected to a voltage source +Ug via a resistor Rg and a contact g in series, the contact g being controlled by the winding 1 of a relay to a terminal G; the contact g and the winding 1 of the relay can be replaced by a semiconductor switch of the transistor type. The protective device A1 is constituted by a resistor Rk and a contact k in series, said contact k being controlled by the winding 2 of a relay connected to the terminal S. To put a call through after detection of the calling subscriber, search for the called subscriber and search for a free vertical line, a signal is applied to the terminal S of the protective device A1; this signal controls the closing of the contact k. The same signal is also applied to the terminals S of the protective device A2 connected to the wire d of the horizontal line H1 (FIG. 1) so as to connect the winding E of the subscriber's transformer to the wires c and d of the horizontal line H1. At the same time as a signal is applied to the terminal S of the protective device A1, another signal is applied to the terminal G of the winding 1 of the connection point P11, assuming that the free vertical line is V1. The thyristor T1 becomes conductive, a current being established in the circuit which comprises the coil L, the thyristor T1, the resistor Rk and the contact k; the wire c is then brought to a positive potential in relation to the potential −U, the value of this positive potential being such that it prevents any trigger current from passing from the other thyristors connected to the wire c, which prevents any undesirable parallel connection of vertical lines with the vertical line V1. The trigger current of the thyristor T1 of the connection point P11 is also cancelled as soon as the thyristor is fired, but this has no effect on the conduction of said thyristor. After the thyristor T1 of the connection point P11 has been fired, the signal applied to the terminal G of the winding 1 is cancelled and the contact g opens. The contact k of the protective device A1 remains closed during the call. When one of the subscribers rings off, this is detected, in accordance with the usual procedure and the signal applied to the terminal S of the protective device A1 is cancelled, this causing the contact k to open, the thyristor T1 to be blocked by cutting the holding current and the positive potential on the wire c to be cancelled. What has just been said concerning the operation of the protective device A1 and the thyristor T1 of the connection point P11 applies to the protective device A2 and to the thyristor T2 of the connection point P11, the signal applied to the terminal S of the protective device A1 being applied simultaneously to the terminal S of the protective device A2 and the signal which controls the firing of the thyristor T1, controlling simultaneously the firing of the thyristor T2 of the connection point P11, so that the wire d is brought to a positive potential which prevents any trigger current of the other thyristors connected to said wire d from passing. As putting a call through also requires the closing of a second connection point, e.g. Pm1 (FIG. 1), the terminals 5 of the protective devices B1 and B2 also receive a signal so as to close their contacts k; likewise a signal controls the firing of the thyristors T1 and T2 of the connection point Pm1; the wires c and d of the horizontal line Hm are each brought to a positive potential when the thyristors T1 and T2 are conductive.

FIG. 3 shows a variant of the protective device, which will be used preferably rather than the embodiment shown in FIG. 2. FIG. 3 shows again the wires c and d and the thyristor T1 with its trigger control circuit, as in FIG. 2, it being possible to replace said circuit by an equivalent semiconductor circuit. The protective device shown is a current generator which can be of any known type. In FIG. 3, the current generator shown includes an NPN type transistor 5 whose collector is connected to the wire c and whose emitter is connected to the voltage source $-U$ by a resistor 6; the base of the transistor 5 is biased by a voltage divider constituted by a resistor 3 and a Zener diode 4, said divider being connected firstly to the voltage at the input S and secondly to the negative voltage source $-U$; in the rest position, the voltage at the input S is very close to $-U$ so as to block the transistor 5.

To close the connection point P11 and hence to make the thyristor T1 conductive when a call is put through, a signal is applied to the terminal S of the protective device A1. The transistor 5 which is normally blocked then becomes conductive; since the terminal G of the winding 1 receives a signal, the contact g closes and a trigger current flows through a resistor Rg, the thyristor T1, the transistor 5 and the resistor 6; since the trigger current which passes through the collector is at least five times lower than the emitter-base current, the transistor 5 operates in its saturation zone and has a low impedance, this allowing the trigger current to pass. As soon as the the thyristor is fired, a current I passes through it which is very much greater than the trigger current; the voltage between the collector and the emitter of the transistor rises, bringing the collector and hence the wire c to a positive potential which limits the trigger current of the thyristors connected to the wire c. As in the case of FIG. 2, the signal on the terminal G is cancelled after the thyristor T1 has been fired and the signal is cancelled on the terminal S of the protective device when ringing off is detected. Of course, the wire d of the horizontal line H1 is simultaneously brought to a positive potential by the protective device A2, FIG. 1, which is identical to the protective device A1 which has just been described and the thyristor T2 of the connection point P11 must be conductive at the same time as the thyristor T1 of said connection point.

The thyristor switching matrix therefore includes a protective device for each wire of a horizontal line, which prevents the parallel connection of two or several vertical lines subsequent to an erroneous trigger order of the thryristors of one or several connection points, or subsequent to an interference trigger current. It is however possible to connect several subscribers, i.e. to form a conference circuit; indeed, although the protective devices prevent the connection of more than one vertical line to a horizontal line, they do not prevent the connection of one vertical line to several horizontal lines.

In the examples described and illustrated, each horizontal line and each vertical line is constituted by two wires; the examples relate to a switching matrix for application to telephony; of course, each vertical line and each horizontal line could comprise a single wire and each connection point would then comprise only one thyristor, as is well known. Although the thyristors in the examples described are of the PNPN type, it is also quite possible to use NPNP type thyristors; in this case, the vertical lines are connected to the negative voltage source $-U$ and the protective device is connected to the positive voltage source $+U$; the trigger is connected via the resistor Rg and the contact g to the negative voltage source $-Ug$. Under these conditions, when the thyristor is conductive, the wire c is brought to a negative potential by bringing it back to the voltage $+U$, this negative potential being sufficient for the current in the trigger circuit of a thyristor connected to the wire c to be less than the minimum trigger current necessary for firing said thyristor.

Thus, whether the thyristors are of the PNPN or NPNP type, as soon as a thyristor is fired, the horizontal line to which it is connected is brought to a potential which is sufficient for the current in the trigger circuit of another thyristor connected to said horizontal line to be less than the minimum trigger current necessary for firing the said other thyristor.

We claim:

1. A thyristor switching matrix comprising horizontal lines, vertical lines and thyristor connection points between the horizontal lines and the vertical lines, each vertical line and each horizontal line comprising at least one wire, the vertical lines being connected to one polarity of a DC source, each wire of each horizontal line being connected to the other polarity of said source via a protective device, each thyristor being controlled by trigger means, a protective device and trigger means of a thyristor connected to the horizontal line connected to said protective device being responsive to the presence of a mark signal and connecting said horizontal line to a vertical line, said protective device having connecting means for isolating the horizontal line to which it is connected in the absence of a mark signal and for bringing said horizontal line to a potential when a mark signal is applied to the protective device, said trigger means of the other thyristors connected to said horizontal line having their trigger voltage reduced by said potential of said horizontal line to a value that does not allow the firing of said thyristors, protective devices of the other horizontal lines and trigger means of the thyristor connected between said vertical line and the other horizontal lines being able to establish a connection with said horizontal line by said vertical line upon receipt of a mark signal.

2. A thyristor switching matrix according to claim 1, wherein the protective device is a current generator controlled by a signal when a closing order is applied to a connection point, said current generator being connected to the output between a horizontal line and the current source.

3. A thyristor switching matrix according to one of claims 1 or 2, wherein each vertical line and each horizontal line comprises two wires.

* * * * *